United States Patent Office 3,243,399
Patented Mar. 29, 1966

3,243,399
STABLE AQUEOUS EMULSIONS OF COPOLYMERS HAVING SELF-CROSS-LINKING PROPERTIES
Karl Dinges, Cologne-Stammheim, and Erwin Müller and Karl-Heinrich Knapp, Leverkusen, Germany, assignors to Farbenfabriken Bayer Aktiengesellschaft, Leverkusen, Germany, a German corporation
No Drawing. Filed July 3, 1962, Ser. No. 207,419
Claims priority, application Germany, July 18, 1961, F 34,461
17 Claims. (Cl. 260—29.6)

The present invention relates to stable aqueous emulsions of copolymers with self-cross-linking properties as well as a method for producing cross-linked materials from these copolymers.

It is known to produce aqueous dispersions of self-cross-linking copolymerisates in that acrylic or methacrylic acid amides, in which the amide groups are substituted by a methylol or methylol-alkyl ether group, are copolymerised in aqueous emulsion with other olefinically unsaturated monomers.

It has also been suggested to subject to copolymerisation Mannich bases of acrylic and methacrylic acid amide, in aqueous emulsion, together with other olefinically unsaturated monomers.

According to these processes, copolymers are obtained which possess self-cross-linking properties since, under the influence of heat and/or of acidic catalysts, they can be converted into cross-linked, insoluble copolymers. However, aqueous dispersions of these copolymers still require improvement for some fields of application. For example, it is known that copolymers having three methylol groups slowly cross-link upon standing for a long time at room temperature and thus become unusable. Copolymers with methyol ether groups do not exhibit this phenomenon but the cross-linking temperatures of the films produced from these emulsions are, on the other hand, too high for some purposes. Thus, in practice, there are, for example, desired copolymers which can be stored in form of their emulsions for unlimited periods of time, the film of which, however, after drying can be made insoluble at room temperature or only a little higher.

It has now been found that extraordinarily stable aqueous copolymerisate dispersions based on acrylamide derivatives can be produced, the films, coatings, coverings and the like of which can, nevertheless, be exceptionally easily cross-linked. Dispersions of this kind are characterised by a content of coplymers from
  (a) Olefinically unsaturated monomers being capable of copolymerizing with acrylic acid derivatives, and
  b) 0.5 to 50 of an acrylic acid amide derivative of the general formula (I) $\quad CH_2=C-CO-NH-CH_2-O-Z$
$\qquad\qquad |$
$\qquad\qquad R_1$ wherein R indicates a hydrogen atom on methyl group and Z stands for a saturated aliphatic hydrocarbon radical containing at least one hydrophilic group Y.

As hydrophilic group Y there are more especially to be considered groups respectively single atoms such as halogen, —COOH, —SO$_3$H, —O—R$_2$, —CN, —NO$_2$ and

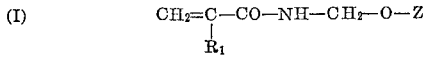

whereby R$_2$ in both cases indicates a lower alkyl having from 1–5 carbon atoms and n stands for a whole number from 1 to 25.

Of preferred interest within the scope of this invention there are methylolether derivatives of N-methylol acrylic acid amide, wherein the etherifying group corresponds to the radical —(CH$_2$)$_x$—Y, i.e. compounds according to the general formula (II) $\quad CH_2=C-CO-NH-CH_2-O-(CH_2)_x-Y$
$\qquad\qquad |$
$\qquad\qquad R_1$ wherein Y has the same significance as given above and x indicates a whole number of from 1 to 20.

On the other hand valuable monomers are represented by compounds according to general Formula I
  (a) wherein Y indicates radical

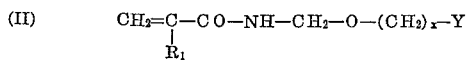

wherein n stands for a whole number of between 1 and 25, preferably 10 and 15
  (b) wherein Z represents a group

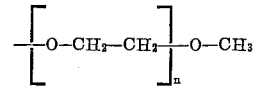

and
  (c) wherein Z represents a group

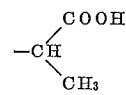

whereby hal stands for a halogen atom, especially such as chlorine or bromine.

As examples of compounds of the above-mentioned type which are usable for the present process, there may be mentioned:

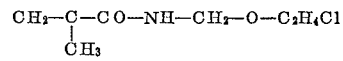

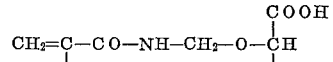

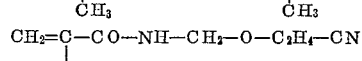

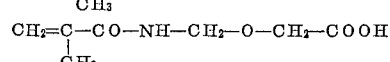

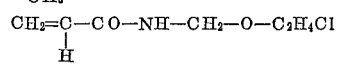

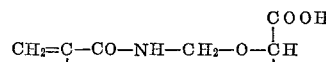

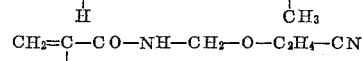

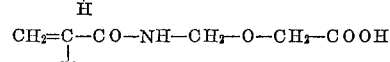

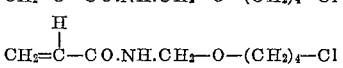

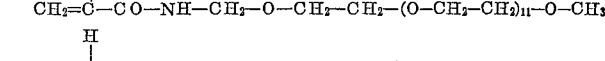

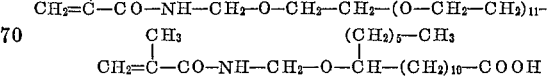

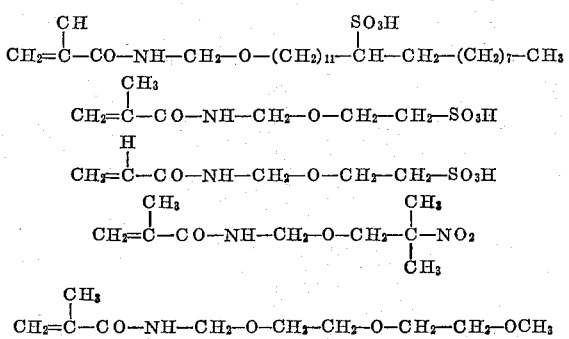

$$CH_2=\overset{CH_3}{\underset{|}{C}}-CO-NH-CH_2-O-CH_2-CH_2-SO_3H$$

$$CH_2=\overset{H}{\underset{|}{C}}-CO-NH-CH_2-O-CH_2-CH_2-SO_3H$$

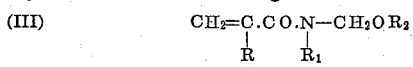

$$CH_2=\overset{CH_3}{\underset{|}{C}}-CO-NH-CH_2-O-CH_2-CH_2-O-CH_2-CH_2-OCH_3$$

It is, of course, also possible to use mixtures thereof instead of the individual above-mentioned compounds.

Suitable olefinically unsaturated monomers which are copolymerisable with compounds of the above-mentioned type belong preferably to the following classes of compounds:

(a) α,β-olefinically unsaturated monocarboxylic acids and their derivatives, such as, for example, esters of acrylic and methacrylic acid with saturated, monohydric aliphatic or cycloaliphatic alcohols with 1 to 20 carbon atoms, acrylic and methacrylic acid amides, acrylo- and methacrylonitrile (b) aromatic vinyl compounds, such as styrene, α-methylstyrene, dichlorostyrenes and other derivatives (c) aliphatic vinyl compounds, such as vinyl ether, vinyl esters, vinyl ketones, vinyl halides, such as, e.g. vinyl chloride, vinyl acetate, vinyl propionate, vinyl ethyl ether, as well as vinylidene chloride (d) conjugated diolefins with 4 to 6 carbon atoms, such as butadiene, isoprene, 2,3-dimethyl-butadiene, chloroprene (e) methylol compounds of acrylic acid and methacrylic acid amide of the general Formula II (III) $\quad CH_2=\underset{\underset{R}{|}}{C}.CO.\underset{\underset{R_1}{|}}{N}-CH_2OR_2$ in which R stands for hydrogen or methyl, $R_1$ for hydrogen, alkyl, aralkyl or aryl, $R_2$ for alkyl or cycloalkyl, such as, for example, methyl, ethyl, n-propyl, isopropyl, n-butyl, isobutyl, cyclohexyl (amounts of monomers (e) preferably up to 15% calculated on total amount of monomers)

(f) furthermore, Mannich bases of acrylic and methacrylic acid amide of the general Formula III (IV) 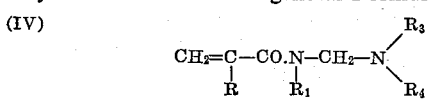

in which R and $R_1$ have the same meanings as in Formula II and $R_3$ and $R_4$ stand for alkyl, cycloalkyl, aralkyl or, together, for a heterocyclic residue, such as the morpholine residue (amount of monomers (f) preferably between 0 and 15% related on total amount of monomers employed).

Furthermore, a whole series of olefinically unsaturated monomers are copolymerisable without difficulty, but are, in general, of minor technical interest.

Furthermore, cross-linking monomers with several olefinically unsaturated groups although not necessary can be used in amounts of about 0.01–10%, referred to the weight of the total monomers, such as, for example, glycol diacrylate, glycol dimethacrylate, acrylic acid and/or methacrylic acid allyl ester, divinyl-benzene, triacryloyl perhydro-s-triazine, triallyl cyanurate or substitution products of the mentioned compounds.

The choice of these monomers depends on the desired properties of the mixed polymerisates. Preferably, one or more strengthening (i.e. in the sense of increasing the hardness of the polymerisation) monomers are combined with an elastifying monomer and this mixture subjected to the co-polymerisation.

As elastifying monomers in the above-mentioned sense, there are understood conjugated diolefins, esters of acrylic acid with more than two carbon atoms in the ester grouping, as well as esters of methacrylic acid with more than four carbon atoms in the ester grouping. The proportion of elastifying monomer should preferably amount to 40–70% of the amount of the co-monomers added besides the monomers to be used according to the invention.

As strengthening monomers in the above-mentioned sense, there are to be mentioned, in the one hand, styrene, as well as substituted styrenes, and, on the other hand, acrylonitrile or methacrylonitrile, as well as vinyl chloride. The last-mentioned monomers are preferably used in an amount corresponding to the difference between elastifying monomers and strengthening monomers.

The aqueous mixed polymerisate dispersions of the present process are obtained in that the above-described monomers are co-polymerised in aqueous dispersion in known manner, with the use of emulsifying agents. For this purpose, not only cation-active but also anion-active, as well as non-ionic emulsifying agents, as well as combinations of these emulsifying agents, can be used.

As emulsifiers suitable for the present process there may, for example, be mentioned: anionic emulsifiers, such as, e.g. the salts of long chain alkyl monocarboxylic acids (fatty acids, resin acids), salts of acidic alkyl sulphuric acid esters, salts of alkyl sulphonic acids, as well as alkylaryl sulphonic acids, salts, of fatty acid condensation products with hydroxyalkyl carboxylic acids, aminoalkyl carboxylic acids and others, and finally the salts of sulphonated ethylene oxide adducts.

As representatives of cationic emulsifiers, there may be mentioned, for example, salts of alkylamines, aryl-, alkylaryl- or resin amines and inorganic or organic acids, as well as salts of quaternary ammonium compounds.

As emulsifiers of non-ionic character, there are suitable the known reaction products of ethylene oxide with long-chain fatty alcohols or phenols, whereby preferably reaction products with more than 10 ethylene oxide units are used.

The total amount of the above-mentioned emulsifiers can amount to between 0.5 and 20%, calculated on the total amount of monomers. It preferably lies between 2 and 10%.

A special form of carrying out the claimed process consists in that only non-ionic emulsifiers are used, whereby at most 0.5% of cationic or anionic emulsifiers, referred to the polymerisate, are present. In this way, latices of particularly high stability or of a high re-emulsifiability are obtained. Under re-emulsifiability there is to be understood the ability of the film obtained from the mixed polymerisate latex by drying at room temperature at a pH of about 7, still to be readily redispersed with water after a certain time.

The polymerisation is admittedly preferably carried out at temperatures below 50° C. but temperatures within the range of 10° to 80° C. are, in principle, possible.

The pH value to be maintained during the production of the mixed polymerisates can vary within wide limits, preferably between pH 3–9, whereby, in the case of the production of re-emulsifiable latices, the maintenance of a pH between 4–6 has proved to be satisfactory.

Re-emulsifiable latices are obtained in that the stated monomers are co-polymerised in an aqueous dispersion, with the use of emulsifying agents of a non-ionic character at a pH value under 6 and at a temperature above 50° C., with olefinic monomers with hydrophilic groups and the dispersions obtained adjusted to pH values of about 6.5–9.

Compounds which regulate the molecular weight, such as long-chain alkyl mercaptans (10–14 carbon atoms), diisopropyl xanthate and others, can also be used in the polymerisation.

As polymerisation catalysts there can be taken into consideration inorganic per compounds, such as potassium or ammonium persulphate, hydrogen peroxide, percarbonates, organic peroxide compounds, such as acyl peroxides, for example, benzoyl peroxide, alkyl hydroperoxides, such as tert.-butyl hydroperoxide, cumol hydroperoxide, p-menthane hydroperoxide, dialkyl peroxides, such as di-tert.-butyl peroxide. Advantageously, the inorganic or organic per compounds are used, in known manner, in combination with reducing agents. Suitable reducing agents are, for example, sodium pyrosulphite or bisulphite, sodium formaldehyde sulphoxylate, triethanolamine.

The amounts of catalyst to be taken into consideration lie within the limits usually used in the case of polymerisations of this type, i.e. between 0.01–5%, calculated on the total amount of monomer used.

The copolymerisates of the described dispersions possess methylol ether groupings which, at elevated temperatures and/or by the action of acidic catalysts, are split and, at the same time, effect a self-cross-linking of the copolymerisates with the formation of insoluble cross-linked product. On the basis of their property of being converted into insoluble cross-linked products, even under mild conditions, the mentioned polymerisates and copolymerisates can be used for the production of any desired formed bodies, such as coatings, impregnations and adhesives. In this case, it is possible to proceed in such a manner that the dispersions are adjusted to an acidic pH value, preferably 2–5, with suitable acids or acidic compounds, such as, for example, hydrochloric acid, sulphuric acid, phosphoric acid, acetic acid, tricrloroacetic acid, ammonium chloride or acid phosphates, the dispersions then placed on suitable substrata and the water evaporated at elevated temperatures, whereby the cross-linking of the polymerisate takes place. It is, however, also possible to effect the cross-linking merely by the action of heat, whereby temperatures of about 80–200° C., preferably 100–150° C., have proved to be suitable.

Insofar as the compounds to be subjected to the copolymerization according to the present process contain solubilising hydrophilic groups, such as, for example, —COOH or —SO$_3$H groups, it is possible to produce re-emulsifiable latices. Since, in the cross-linking reaction, the solubilising groups are again split off, cross-linked products with hydrophobic properties can be obtained in this manner.

Although it is, in principle, possible to use the described re-emulsifiable, self-cross-linking mixed polymerisate emulsions, without the addition of cross-linking agents, for the production of formed bodies, it can, in some cases, be advantageous to add to the dispersions additional cross-linking agents, such as, for example, water-soluble condensation products of aldehydes, especially formaldehyde, with urea, melamine or alkylmethylol ether derivatives of such compounds, in order to effect an additional cross-linking of the formed bodies.

The copolymer dispersions according to this invention advantageously may be used for impregnating different fibrous substrates, especially textile materials, and subsequent cross-linking the obtained films by heating or acidifying in a manner as described above in order to obtain solvent resistant and elastic coatings.

In the following examples, the stated parts are parts by weight, if not otherwise stated.

EXAMPLES 1–4

A mixture of 116 parts of acrylic acid butyl ester and 73 parts of styrene in a solution of 5 parts of acrylamide in 300 parts of water, 6 parts of a sodium salt of an alkyl sulphuric acid ester with 10–16 carbon atoms and 6 parts of a reaction product of a hydroxy-diphenyl-methane with 13–15 mol of ethylene oxide, as well as 6 parts of a compound from the following table, is emulsified in a reaction vessel provided with a stirrer and thermometer. After the temperature has risen to 40° C., 0.8 part of potassium persulfate and 1.2 parts of sodium pyrosulphite are added. The polymerisation is allowed to proceed at about 45° C.

A mixed polymerisate emulsion is obtained with a solids content of 38%. A part of this mixed polymerisate emulsion is adjusted to a pH of 2.0 and allowed to dry on glass plates at room temperature. After 20 hours the polymerisate film formed is tested as to its solubility in dimethyl formamide. The results obtained are summarised in the following table.

| Experiment No. | Compound | Solubility in dimethylformamide | |
|---|---|---|---|
| | | pH 2 | pH 7 |
| 1 | $CH_2=C(CH_3)-CO-NH-CH_2-O-C_2H_4Cl$ | 0 | 0 |
| 2 | $CH_2=C(CH_3)-CO-NH-CH_2-O-CH(COOH)(CH_3)$ | 0 | 0 |
| 3 | $CH_2=C(CH_3)-CO-NH-CH_2-O-C_2H_4-CN$ | 0 | 1 |
| 4 | $CH_2=C(CH_3)-CO-NH-CH_2-O-CH_2-COOH$ | 0 | 0 |
| A | $CH_2=C(CH_3)-CO-NH-CH_2-O-CH_3$ | 2 | 2 |

0=insoluble; 1=partially soluble; 2=soluble.

In Example A, a comparative mixture of the known mixed polymerisate emulsion is used which contains methylol methyl ether groups. From this series of experiments, it can be seen that the claimed mixed polymerisate emulsions are much easier to cross-link than the products of the prior art.

EXAMPLE 5

A solution of 430 parts of water, 20 parts of a reaction product of 1 mol of cetyl alcohol and 13–15 parts of ethylene oxide are placed in a stirrer vessel. About 1/10 of a monomer mixture of 200 parts of acrylic acid butyl ester, 40 parts of acrylic acid methyl ester, 98 parts of acrylonitrile and 0.2 part of n-dodecyl mercaptan are emulsified therein. After displacement of the air by nitrogen and heating the mixture to 35° C., the polymerisation is started by the addition of 0.5 parts of potassium persulphate and 1.0 parts of sodium pyrosulfite. From 4 dropping funnels there is now allowed to run in uniformly, in the course of 3 hours, (a) the remainder of the monomer mixture, (b) a solution of 20 parts of the compound:

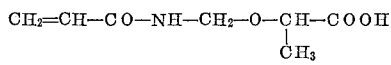

in 100 parts of water, (c) 3 parts of sodium pyrosulphite in 50 parts of water and (d) 2 parts of potassium persulphate in 170 parts of water. The polymerisation temperature is maintained at 40–45° C. by external cooling. After a subsequent stirring period of 1–2 hours, the polymerisation is ended. The pH value of the approximately 38% dispersion is adjusted to about 7.

A few drops of this dispersion, after rubbing to dryness on the palm of the hand, can again be stirred up with water to the original dispersion.

Films produced from the dispersion show, after brief heating at 120° C. or after standing for a longer time at room temperature, still only a very slight water swelling.

EXAMPLE 6

A solution of 860 parts of water, 24 parts of an alkyl sulphonate with 10–18 carbon atoms and 400 parts of a 25% solution of the reaction product of 1 mol of cetyl alcohol and 13–15 parts of ethylene oxide is placed in a stirrer vessel. After the addition of 0.8 part of sodium hydroxide, 1.12 parts of ammonia (30%) and 0.24 part of triethanolamine, the solution has a pH value of 7.5 to 8.0. A mixture of 248 g. of styrene, 400 g. of acrylic acid butyl ester, 80 g. of acrylic acid ethyl ester, 32 g. of methacrylic amide methylol methyl ether and 40 g. of the compound $$CH_2=CH-CO-NH-CH_2-O-\underset{\underset{CH_3}{|}}{CH}-COOH$$

are now added at 25° C. and the polymerisation initiated with 0.42 g. of potassium persulphate.

After termination of the polymerisation after about 5 hours, there is obtained a very stable 38–39% latex.

EXAMPLE 7

The mixture of 8 litres of butadiene, 2680 of acrylonitrile, 20 g. of dodecyl mercaptan and 80 g. of the compound $$CH_2=\underset{\underset{CH_3}{|}}{C}-CO-NH-CH_2-O-CH_2-COOH$$

is emulsified with a solution of 320 g. of an alkyl sulphonate with 14–16 carbon atoms in 11.2 litres of water in a compression-resistant reaction vessel of about 40 litres capacity provided with a stirrer and thermometer. After the addition of 7 g. of tert.-butyl hydroperoxide, the polymerisation begins after a short latent period and is carried out up to a yeild of 75%.

Instead of the carbocyclic acid in this example the corresponding sulphonic acid $$CH_2=\underset{\underset{CH_3}{|}}{C}-CO-NH-CH_2-O-CH_2-SO_3H$$

may be used without disadvantage.

What is claimed is:

1. A stable latex of a copolymer of self-cross-linking properties comprising a copolymer of (1) an olenfinically unsaturated monomer selected from the group consisting of an α,β-olefinically unsaturated monocarboxylic acid, an α,β-olefinically unsaturated monocarboxylic acid amide, an α,β-olefinically unsaturated monocarboxylic acid ether, an α,β-olefinically unsaturated monocarboxylic acid nitrile, an aromatic vinyl monomer, an aliphatic vinyl ether, and an aliphatic conjugated diolefin having 4–6 carbon atoms and (2) 0.5 to 50% of a comonomer of the general formula $$CH_2=\underset{\underset{R}{|}}{C}-\overset{\overset{O}{\|}}{C}-NH-CH_2-O-Z$$

wherein R is a member selected from the group consisting of hydrogen and methyl and Z stands for a saturated aliphatic hydrocarbon radical containing from 1 to 20 carbon atoms and at least one hydrophilic group Y, said group Y being selected from the group consisting of halogen, —COOH, —SO$_3$H, —O—R$_2$, —CN, —NO$_2$ and $$-[O.CH_2.CH_2]_n-O-R_2$$

wherein R$_2$ in both cases is a lower alkyl radical having from 1 to 5 carbon atoms and $n$ is a whole number from 1 to 25.

2. The stable copolymer latex of claim 1 wherein said saturated aliphatic hydrocarbon radical Z stands for —(CH$_2$)$_x$—Y wherein Y is defined in claim 19 and $x$ is a whole number from 1 to 20.

3. The stable copolymer latex of claim 1 wherein said aliphatic saturated hydrocarbon radical Z is —(CH$_2$)$_2$—Y wherein Y represents a halogen atom.

4. The stable copolymer latex of claim 1 wherein Z is —CH$_2$—COOH.

5. The stable copolymer latex of claim 1 wherein Z is —CH$_2$—CN.

6. The stable copolymer latex of claim 1 wherein Z is —(CH$_2$)—CN.

7. The stable copolymer latex of claim 1 wherein Z is —CH$_2$—SO$_3$H.

8. The stable copolymer latex of claim 1 wherein Y is a methyl ether of a polyethylenoxide derivative of the formula $$-[O-CH_2-CH_2]_n-O-CH_3$$

wherein $n$ is a whole number from 10–15.

9. The latex of claim 1 wherein Z is the group $$-CH\diagup\!\!\!\!\diagdown\begin{matrix}COOH\\CH_3\end{matrix}$$

10. The latex of claim 1 wherein said radical Z represents the group $$-CH\diagup\!\!\!\!\diagdown\begin{matrix}CH_2\ Hal\\CH_2\ Hal\end{matrix}$$

and Hal represents a halogen atom.

11. A stable latex of a copolymer of self-cross-linking properties comprising a copolymer of (1) an olefinically unsaturated monomer selected from the group consisting of an α,β-olefinically unsaturated monocarboxylic acid, an α,β-olefinically unsaturated monocarboxylic acid amide, an α,β-olefinically unsaturated monocarboxylic acid ether, an α,β-olefinically unsaturated monocarboxylic acid nitrile, an aromatic vinyl monomer, an aliphatic vinyl ether, and an aliphatic conjugated diolefin having 4–6 carbon atoms, (2) 0.5 to 50% of a comonomer of the general formula $$CH_2=\underset{\underset{R}{|}}{C}-\overset{\overset{O}{\|}}{C}-NH-CH_2-O-Z$$

wherein R is a member selected from the group consisting of hydrogen and methyl and Z stands for a saturated aliphatic hydrocarbon radical containing from 1 to 20 carbon atoms and at least one hydrophilic group Y, said group y being selected from the group consisting of halogen, —COOH, —SO$_3$H, —O—R$_2$, —CN, —NO$_2$ and $$-[O.CH_2.CH_2]_n-O-R_2$$

wherein R$_2$ in both cases is a lower alkyl radical having from 1 to 5 carbon atoms and $n$ is a whole number from 1 to 25 and (3) a Mannich base of the general formula $$CH_2=\underset{\underset{R}{|}}{C}-\overset{\overset{O}{\|}}{C}-\underset{\underset{R_1}{|}}{N}-CH_2OR_2$$

wherein R is a member selected from the group consisting of hydrogen and methyl, R$_1$ is a member selected from the group consisting of hydrogen and lower alkyl having from 1–4 carbon atoms, and R$_2$ is a member selected from the group consisting of a lower saturated aliphatic hydrocarbon radical having 1–6 carbon atoms and a cycloalkyl radical, said Mannich base being employed in amounts of up to 15% based on the total amount of monomers.

12. A process for the preparation of a stable latex of a high molecular weight linear copolymer which comprises subjecting to copolymerization in an aqueous dispersion (1) an olefinically unsaturated monomer selected from the group consisting of an α,β-olefinically unsaturated monocarboxylic acid, an α,β-olefinically unsaturated monocarboxylic acid amide, an α,β-olefinically unsaturated monocarboxylic acid ether, an α,β-olefinically unsaturated monocarboxylic acid nitrile, an aromatic vinyl monomer, an aliphatic vinyl ether, and an aliphatic conjugated diolefin having 4–6 carbon atoms, (2) 0.5 to 50% of a comonomer of the general formula

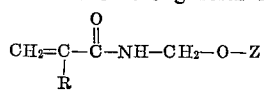

wherein R is a member selected from the group consisting of hydrogen and methyl and Z stands for a saturated aliphatic hydrocarbon radical containing from 1 to 20 carbon atoms and at least one hydrophilic group Y, said group Y being selected from the group consisting of halogen, —COOH, —SO$_3$H, —O—R$_2$, —CN, —NO$_2$ and

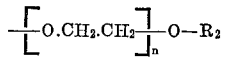

wherein R$_2$ in both cases is a lower alkyl radical having from 1 to 5 carbon atoms and $n$ is a whole number from 1 to 25 and (3) a Mannich base of the general formula

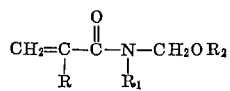

wherein R is a member selected from the group consisting of hydrogen and methyl, R$_1$ is a member selected from the group consisting of hydrogen and lower alkyl having from 1–4 carbon atoms, and R$_2$ is a member selected from the group consisting of a lower saturated aliphatic hydrocarbon radical having 1–6 carbon atoms and a cycloalkyl radical, said Mannich base being employed in amounts of up to 15% based on the total amount of monomers; said copolymerization being conducted at a pH value between 3 and 9 and at a temperature below 50° C. with the use of non-ionic emulsifying agents.

13. The process of claim 12 wherein said non-ionic emulsifying agent is employed in conjunction with not more than 0.5% by weight of total monomers of a member selected from the group consisting of cationic and anionic emulsifiers.

14. The process of claim 12 wherein another comonomer is employed in said copolymerization process and consists of 0.01–10% by weight of total monomers of an olefinically unsaturated monomer having at least two olefinically unsaturated non-conjugated polymerizable carbon to carbon double bonds.

15. A process for the preparation of a high molecular weight cross-linked copolymer which comprises heating at temperatures of 80–200° C. the copolymer latex of claim 1.

16. A process for the preparation of a high molecular weight cross-linked copolymer which comprises adjusting the pH of the latex of claim 1 to a pH value of at least two.

17. A process for the preparation of a high molecular weight cross-linked copolymer which comprises adjustment of the pH of the copolymer latex of claim 1 to a value of 2–5 and at the same time heating to a temperature of 100–150° C.

References Cited by the Examiner

UNITED STATES PATENTS

| | | | |
|---|---|---|---|
| 2,984,588 | 5/1961 | Granlich et al. | 260—29.6 |
| 3,007,887 | 11/1961 | Essig | 260—29.6 |
| 3,033,811 | 5/1962 | Brown et al. | 260—29.6 |

MURRAY TILLMAN, *Primary Examiner.*

WILLIAM H. SHORT, JEROME NORRIS, PAUL LIEBERMAN, *Assistant Examiners.*